June 25, 1935.  E. S. AXELBERG  2,005,963
TURN SIGNAL
Filed April 30, 1934   2 Sheets-Sheet 1

INVENTOR.
EINAR S. AXELBERG.
BY HIS ATTORNEYS.

June 25, 1935.  E. S. AXELBERG  2,005,963
TURN SIGNAL
Filed April 30, 1934  2 Sheets-Sheet 2
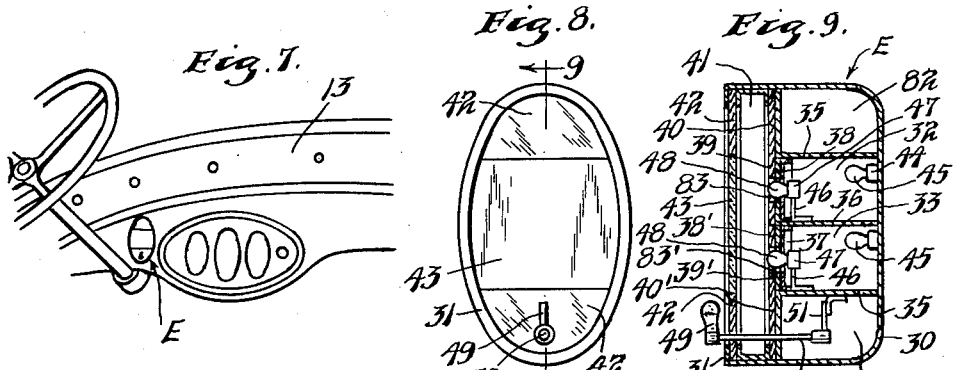
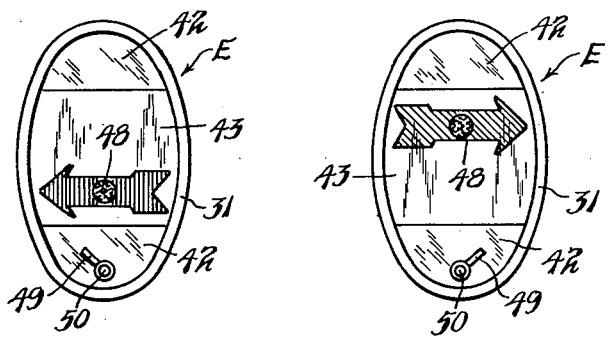
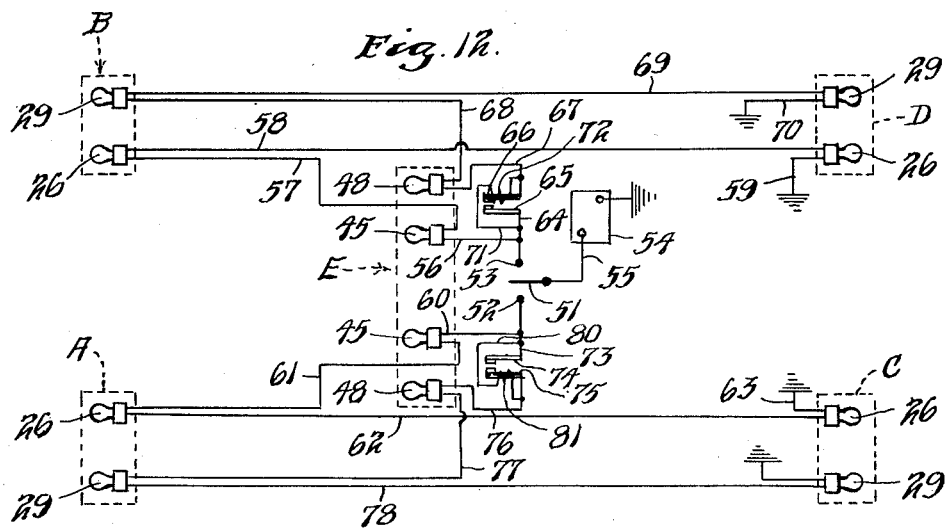
INVENTOR.
EINAR S. AXELBERG.
BY HIS ATTORNEYS.
Williamson & Williamson Patented June 25, 1935

2,005,963

UNITED STATES PATENT OFFICE 2,005,963

TURN SIGNAL

Einar S. Axelberg, Minneapolis, Minn., assignor of one-half to Thomas O. Ormbreck, St. James, Minn.

Application April 30, 1934, Serial No. 723,117

3 Claims. (Cl. 177—339)

This invention relates to turn signals for vehicles.

It is the general object of the invention to provide a novel and improved turn signal of cheap and simple construction, which can be operated with great ease to indicate to pedestrians and to drivers of other vehicles when the vehicle equipped with the turn signal is about to make a turn.

The objects and advantages of the invention will more fully appear from the following description, made in connection with the accompanying drawings, wherein like reference characters refer to the same or similar parts throughout the various views, and, in which, Fig. 1 is a perspective view illustrating the front portion of an automobile equipped with the turn signal of the invention;

Fig. 7 is a perspective view showing the instrument panel of the automobile equipped with the turn signal;

Fig. 8 is a face view of the tell-tale mounted on the instrument panel, as it will appear when not lit up;

Fig. 9 is a vertical section taken on the line 9—9 of Fig. 8, as indicated by the arrows;

Fig. 10 is a face view of the tell-tale as it will appear when lit up for the driver to signal a left turn;

Fig. 11 is a similar view showing the tell-tale as it will appear when lit up for the driver to indicate a right turn; and Fig. 12 is a wiring diagram of the complete turn signal.

Figure 1:
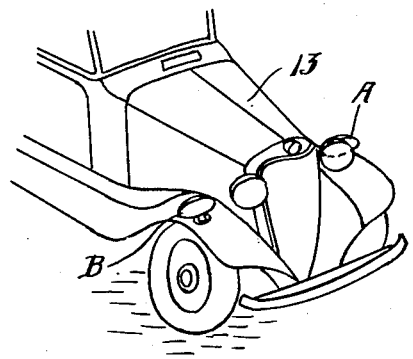
Figure 2:
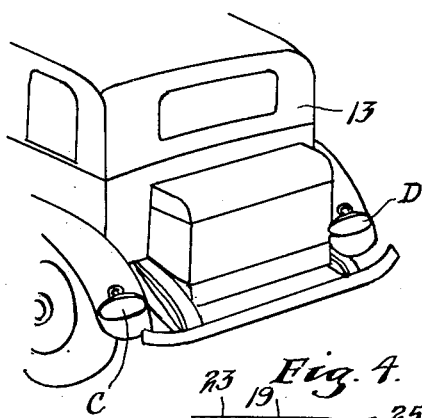
Fig. 2 is a perspective view showing the rear part of the same automobile.
Figure 3:
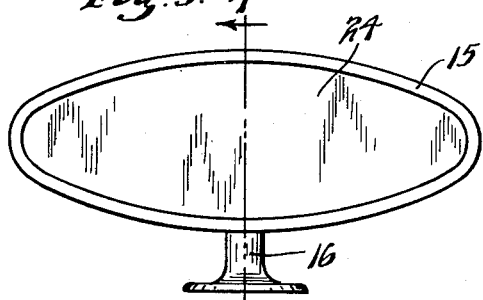
Fig. 3 is a view looking toward the face of one of the signaling devices and showing it as it will appear when not lit up.
Figure 4:
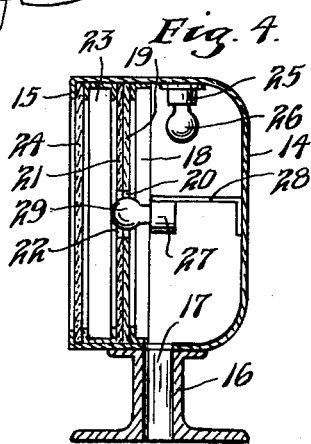
Fig. 4 is a vertical section taken on the line 4—4 of Fig. 3, as indicated by the arrows.
Figure 6:
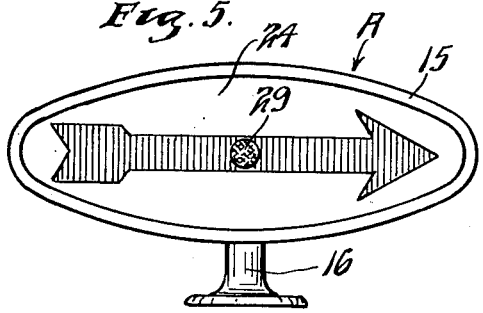
Fig. 6 is a similar view of one of the signaling devices for the front and left side of the car.
Figure 5:
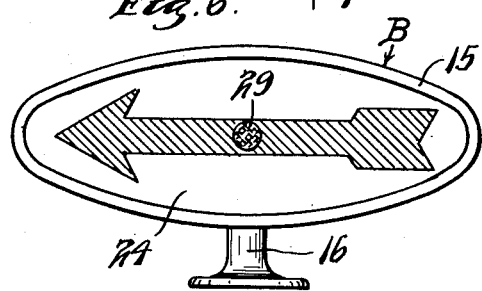
Fig. 5 is a view similar to Fig. 3 showing one of the signaling devices for the front and right side of the automobile as it will appear when lit up.

Referring to the drawings, there are illustrated portions of an automobile 13 having mounted at its forward end at the left side an indicator A as on the left front fender, having mounted at its front at the right side an indicator B as on the right front fender, having mounted at its rear at the left side an indicator C as on the left rear fender, and having mounted at its rear at the right side an indicator D as on the right rear fender. There is also mounted on the instrument board of the automobile 13 a tell-tale E.

The various indicators A, B, C and D are of very similar construction and it will, accordingly, only be necessary to describe one of them in detail and to thereafter point out the slight differences between the various indicators. Each indicator A, B, C and D includes a casing 14 having an open face side. The edges of the casing are flanged inwardly at the face side to form a flange 15. To secure the casing 14 to a part of the automobile there is provided a suitable hollow bracket 16 attached as to the bottom of the casing 14 and the opening in which registers with an opening 17 in the casing to permit electrical wires to be run into the casing. The casing 14 is preferably of substantially ellipse-shape as viewed from its face side, although it will be understood that it can be otherwise shaped if desired. Fitting within the casing and attached thereto in spaced relation from the face side of the same is a collar 18 preferably of angular-shape in cross section. Bearing against the outer side of this collar is a stencil 19 having an arrow-shaped opening 20 therein, or some other corresponding opening shaped conventionally to indicate direction. Outwardly disposed from the stencil 19 is a colored glass 21 which bears against the stencil 19. The glass 21 is provided with an opening 22 which registers with a portion of the opening 20 in stencil 19 and in the illustrated embodiment the opening 22 is centrally located in the glass 21. Another collar 23 preferably of channel-shape in cross section is fitted within the casing 14 outwardly from the glass 21 and this collar has one flange which bears against the glass 21 and it has another flange which bears against a translucent glass 24 interposed between the flange 15 and the collar 23. The translucent glass 24 is preferably a ground or frosted glass which can under ordinary circumstances not be seen through, but which will light up so that it can be seen through when an electric bulb or other light is placed behind the same.

Mounted in the casing 14, as on the top thereof, is an electric socket 25 within which an electric bulb 26 is held. Another electric socket 27 attached as to an angular bracket 28 secured to the rear part of the casing 14 carries an electric bulb 29 which projects through the central part of the opening 20 in stencil 19 and also projects through the opening 22 in colored glass 21. The bulb 29 is preferably colored yellow or amber to contrast perceptibly with the coloring of the glass 21.

The glass 21 used in the indicators A and C at the left side of the vehicle will preferably be colored red, while the glass 21 in the indicators B and D mounted at the right side of the vehicle are preferably colored green. It will, of course, be understood that the various glasses 21 and the bulbs 29 may be colored as desired to conform to traffic ordinances, or to secure the proper visibility. The arrow-shaped openings 20 in the stencils 19 for the indicators A and C at the left side of the vehicle point in the same direction to the left, as viewed in the direction towards which the automobile faces, while as similarly viewed the arrow-shaped openings 20 in the stencils 19 of the indicators B and D point to the right.

Referring now to the tell-tale E, this tell-tale comprises a casing 30 having an open face side and the casing is so mounted on the instrument panel of the vehicle that the face side of the casing will be exposed to view. The edges of the casing are flanged inwardly at the face side to form a flange 31. The inner part of the casing 30 is divided into four chambers 82, 32, 33 and 34 respectively, by upper and lower plates 35 and an intermediate plate 36. The upper and lower plates 35 have horizontal portions attached to the back of the casing 30 and to the sides of the casing and these plates run forwardly and are provided respectively with up and down turned portions connected with the top and bottom of the casing. The plate 36 is attached to the back and sides of the casing and it terminates flush with the forward parts of the plates 35. Within the chambers 32 and 33 are mounted collars 37 which bear against stencils 38 and 38′ received between the plate 36 and the upper plate 35 and the plate 36 and the lower plate 35 respectively. Stencils 38 and 38′ have arrow-shaped openings 39 and 39′ respectively formed therein and the arrow-shaped opening 39 points to the right side of the automobile, while the arrow-shaped opening 39′ points to the left side of the vehicle. Disposed within the casing 30 and extending downwardly from the top of the casing to the plate 36 is a semi-circular glass 40 which is preferably colored green and this glass rests upon a glass 40′ of similar shape and projecting from the bottom of the casing 30 to the plate 36. The glass 40′ is preferably colored red. A collar 41 of preferably channel-shape in cross section is mounted in the casing 30 forward of the glasses 40 and 40′ and one flange of this collar bears against these glasses and holds them in place. The other flange of the collar 41 bears against substantially arcuate-shaped plates 42 disposed between the collar and the flange 31 at the top and bottom of the casing. A translucent glass 43 is interposed between the lower edge of the upper plate 42 and the upper edge of the lower plate 42 and this glass is held in place within the casing by means of the collar 41 and the flange 31. The glass plate 42 lies directly ahead of the two stencils 38 and 38′. The glass 43 will preferably be either ground glass or frosted glass. It should be stated that openings 83 and 83′ are provided in the respective glasses 39 and 39′ and these openings are centrally disposed relative to the openings 39 and 39′ respectively in the stencils 38 and 38′.

Mounted in the chambers 32 and 33 preferably on the rear walls thereof are electrical sockets 44 carrying electric light bulbs 45. Brackets 46 are also mounted within the chambers 32 and 33 and these brackets carry electrical sockets 47 within which bulbs 48 are mounted. The upper bulb 48 projects through the openings 39 and 43, while the lower bulb 48 projects through the openings 39′ and 43′. The two bulbs 48 are preferably of yellow or amber color. A double throw electrical switch including an operating handle 49, a shaft 50, a movable contact 51 attached to the shaft and fixed contacts 52 and 53 with which said movable contact may be alternately engaged is mounted in the lower part of the tell-tale with the operating handle 49 in position convenient to the driver of the vehicle.

Referring now to the wiring diagram Fig. 12, there is illustrated a storage battery 54 having one terminal grounded and the other terminal connected by a wire 55 to the movable contact 51 of the double throw electric switch. A wire 56 runs from the fixed contact 53 of the switch to the upper bulb 45 of the tell-tale E. Another wire 57 runs from this bulb to the bulb 26 of indicator B and yet another wire 58 runs from the bulb 26 of indicator B to the bulb 26 of indicator D and from this last mentioned bulb a wire 59 runs to a ground. Similarly a wire 60 runs from the fixed contact 52 of the electric switch to the lower bulb 45 of tell-tale E, another wire 61 runs from this bulb to the bulb 26 of indicator A and another wire 62 runs from the bulb 26 of indicator A to the bulb 26 of indicator C and a wire 63 runs from the bulb 26 of indicator C to a ground.

A wire 64 joins the wire 56 and runs to a fixed contact 65 of a thermostatic switch including a bimetallic warp bar 66 pivoted at its right end as viewed in the drawings, and having a contact at its left end for cooperative engagement with the contact 65. Another wire 67 is connected to the right end of the warp bar 66 and runs to the upper bulb 48 of the tell-tale E, while another wire 68 runs from the said bulb to the bulb 29 of indicator B and a third wire 69 runs from the bulb 29 of indicator B to the bulb 29 of indicator D and another wire 70 runs from the bulb 29 of indicator D to a ground. A wire 71 connects at one end with the wire 64 and at its other end to one end of a heating coil 72 which surrounds warp bar 66. The other end of the heating coil is connected to the wire 67. The contact 65, warp bar 66, coil 72 and wire 71 form a thermostatic flasher switch in series with the upper bulb 48 of the tell-tale and the bulbs 29 of the two indicators B and D.

In similar manner, a wire 73 joins a wire 60 and runs to a fixed contact 74 of a thermostatic switch including a bimetallic warp bar 75 fixed at its right end as viewed in the drawings, and having a contact at its left end for co-operative engagement with the contact 74. Another wire 76 is connected to the right end of the warp bar 75 and runs to the lower bulb 48 of the tell-tale E, while another wire 77 runs from the said bulb to the bulb 29 of indicator A and a third wire 78 runs from the bulb 29 of indicator A to the bulb 29 of indicator C, and another wire runs from the bulb 29 of indicator C to a ground. A wire 80 connects at one end with the wire 73 and at its other end to one end of a heating coil 81 which surrounds warp bar 75. The other end of the heating coil is connected to the wire 76. The contact 74, warp bar 75, coil 81 and wire 80 form a thermostatic flasher switch in series with the lower bulb 48 of the tell-tale and the bulbs 29 of the two indicators B and D.

It will be seen that the two bulbs 26 of the indicators B and D are in series with the upper bulb 45 of the tell-tale and it will also be seen that the two bulbs 26 of the indicators A and C are in series with the lower bulb 45 of the tell-tale E.

*Operation*

When the driver of an automobile equipped with the turn signal of the invention is driving straight ahead under normal conditions, the operating handle 49 of the double throw electrical switch mounted in the tell-tale will be positioned as shown in Figs. 8 and 9 and, of course, no current from the source of electrical supply, battery 54, can flow to any of the various bulbs. The translucent glasses 24 in the various indicators A, B, C and D will prevent drivers of other vehicles and pedestrians from viewing the colored glasses 21 of the various indicators or the arrows that will be disposed through the openings 20 in stencils 19 when the bulbs 26 are illuminated. Accordingly, pedestrians and drivers of other vehicles will know that the driver of the car equipped with the turn signal expects to continue along a straight forward travel. The ground glass 43 of the tell-tale will, of course, prevent the driver of the automobile equipped with the turn signal from viewing the colored glasses 40 and 40' and the driver will, accordingly, know that none of the indicators A, B, C, or D are in operation.

When the driver of the automobile equipped with the turn signal wishes to make a right turn he will shortly before the turn is made, swing the handle 49 of the electric switch to the right thereby throwing the movable contact 51 of the switch into engagement with the fixed contact 53. An electrical circuit will then be closed from battery 54, wire 55, contact 51, contact 53, wire 56, upper bulb 45 of tell-tale E, wire 57, bulb 26, of indicator B, wire 58, bulb 26 of indicator D and wire 59 to a ground and thus back to the battery. The three mentioned bulbs will accordingly immediately light up and the light from the bulbs 26 of the two indicators B and D will pass through the openings 20 in the stencil 19 of these indicators and through the portions of the glasses 21 overlying these openings to brilliantly expose in green colors arrows pointing to the right of the automobile as viewed either from the rear of the automobile or from the front of the same. Correspondingly the upper bulb 45 of the tell-tale will throw a beam of light through the opening 39 in stencil 38 and expose to view on the face of the tell-tale a green arrow pointing to the right and this will indicate to the driver of the car that the bulbs 26 of the two indicators B and D are lit.

Simultaneously with the establishment of the circuit to the upper bulb 45 of the tell-tale and to the bulbs 26 of the indicators B and D, the circuit will be established from battery 54 through wire 55, contact 51, contact 53, wire 64, wire 71, heating coil 72, wire 67, upper bulb 48 of the tell-tale, wire 68, bulb 29 of indicator B, wire 69, bulb 29 of indicator D, and wire 70 to ground, and thence back to the battery. The current flow through this latter circuit will be insufficient to light up the specified bulbs 48 and 29, but the current flow will be sufficient to heat the coil 72. After this coil 72 has been heating for a very short period of time, the contact of the warp bar 66 will swing into engagement with the contact 65 and thereupon a circuit will be momentarily established from the battery 54, wire 55, contact 51, contact 53, wire 56, wire 64, contact 65, warp bar 66, wire 67, upper bulb 48 of the tell-tale, wire 68, bulb 29, of indicator B, wire 69, bulb 29 of indicator C, and wire 70 to ground and thence back to the battery. These three bulbs 48 and 29 will then be momentarily lit to expose said bulbs to view through the various glasses 24 and the glass 43 of the indicators B and D and the tell-tale E. In other words, these bulbs will flash, thereby attracting attention to the various light colored arrows exposed to view on the indicators B and D and on the tell-tale E. The attention of the pedestrians and drivers of other vehicles will, of course, be called to the two indicators B and D by the flashing of the bulbs 29 of these indicators, and as these bulbs are colored differently than the light arrows exposed to view and the bulbs are exposed to view in the centers of these light arrows, attention will be immediately drawn to the fact that the driver of the vehicle is about to make a right turn. Of course, when the warp bar 66 engages contact 66, the circuit through the heating coil 72 will be shunted out and the warp bar accordingly will begin to cool to withdraw the warp bar from engagement with the contact 65. This will again establish the circuit to the heating coil 72 and intermittent flashing of the upper bulb 48 of the tell-tale and of the two bulbs 29 of the indicators B and D will result. Of course, flashing of the bulb 48 in tell-tale E will indicate to the driver of the vehicle that the bulbs 29 of the indicators B and D are in operation.

After the right turn has been made, the tell-tale E will still remain lit up and this will be a reminder to the driver that he should turn the electrical switch back to its neutral position.

When it is desired to signal a left turn, the handle 49 of the electrical switch will be swung to the left, as viewed in Fig. 10, and circuits similar to those previously mentioned in connection with the tell-tale E and the indicators B and D will be established to the bulbs 26 and 29 of indicators A and C and to the lower bulbs 45 and 48 of the tell-tale. When a left turn is made, red light arrows will be observable as the indicators A and C are viewed and as the tell-tale is viewed and flashes of yellow light will appear intermittently in the centers of these red arrows.

It will be seen that an exceedingly effective turn signal has been provided which is of cheap and simple construction. This turn signal can be installed readily on any vehicle with a minimum amount of labor.

It will, of course, be understood that various changes may be made in the form, details, arrangement and proportions of the various parts without departing from the scope of the present invention, which, generally stated, consists in the matter shown and described and set forth in the appended claims.

What is claimed is:—

1. A turn signal for vehicles comprising a casing adapted to be mounted on a vehicle and having an open face, a direction indicating stencil partially closing said face, said stencil having an opening therethrough, a colored glass at one side of said stencil, said glass having an opening registering with a portion of said first mentioned opening, a first electric bulb mounted in said casing behind said glass and stencil, a second electric bulb mounted in said casing and disposed in said openings and means for simultaneously establishing a continuous electrical circuit to said first bulb and an intermittent electrical circuit to said second bulb.

2. A turn signal for vehicles comprising a casing adapted to be mounted on a vehicle and having an open face, a direction indicating stencil partially closing said face, said stencil having an opening therethrough, a colored glass at one side of said stencil, said glass having an opening registering with a portion of said first mentioned opening, a translucent plate mounted in said casing outwardly from said stencil and glass, a first electrical bulb mounted in said casing behind said glass and stencil, a second electrical bulb mounted in said casing and disposed in said openings and means for simultaneously establishing a continuous electrical circuit to said first bulb and an intermittent electrical circuit to said second bulb.

3. A turn signal for vehicles comprising a casing adapted to be mounted on a vehicle and having an open face, a direction indicating stencil partially closing said face, said stencil having an opening therethrough, a colored glass forward of and adjacent said stencil, said glass having an opening registering with a portion of said first mentioned opening, a translucent plate mounted in said casing outwardly from said stencil and glass, a first electrical bulb mounted in said casing behind said glass and stencil, a second electrical bulb mounted in said casing and disposed in said openings and means for simultaneously establishing a continuous electrical circuit to said first bulb and an intermittent electrical circuit to said second bulb.

EINAR S. AXELBERG.